United States Patent
Tasaki et al.

(10) Patent No.: US 8,877,860 B2
(45) Date of Patent: Nov. 4, 2014

(54) TWO-PART SILICONE RUBBER COMPOSITION

(75) Inventors: Tomoko Tasaki, Chiba (JP); Yuichi Tsuji, Chiba (JP)

(73) Assignee: Dow Corning Toray Co., Ltd., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/007,986

(22) PCT Filed: Mar. 28, 2012

(86) PCT No.: PCT/JP2012/059274
§ 371 (c)(1),
(2), (4) Date: Oct. 14, 2013

(87) PCT Pub. No.: WO2012/133917
PCT Pub. Date: Oct. 4, 2012

(65) Prior Publication Data
US 2014/0039106 A1 Feb. 6, 2014

(30) Foreign Application Priority Data

Mar. 30, 2011 (JP) ................................ 2011-075910

(51) Int. Cl.
| | | |
|---|---|---|
| C09D 183/04 | (2006.01) | |
| C08K 5/09 | (2006.01) | |
| C08L 83/04 | (2006.01) | |
| C09J 183/04 | (2006.01) | |
| C08G 77/12 | (2006.01) | |
| C08G 77/20 | (2006.01) | |
| C08K 3/26 | (2006.01) | |

(52) U.S. Cl.
CPC . *C08K 5/09* (2013.01); *C08L 83/04* (2013.01); *C09D 183/04* (2013.01); *C09J 183/04* (2013.01); *C08G 77/12* (2013.01); *C08G 77/20* (2013.01); *C08K 3/26* (2013.01)
USPC ........... 524/588; 524/425; 525/477; 525/478; 528/15; 528/31; 528/32

(58) Field of Classification Search
None
See application file for complete search history.

(56) References Cited

U.S. PATENT DOCUMENTS

| | | | | |
|---|---|---|---|---|
| 5,486,551 A | * | 1/1996 | Polmanteer | 523/212 |
| 5,908,888 A | * | 6/1999 | Nakamura et al. | 524/433 |
| 6,562,469 B2 | * | 5/2003 | Koyama et al. | 428/447 |
| 7,271,215 B2 | * | 9/2007 | Ikeno et al. | 524/588 |
| 2002/0037963 A1 | | 3/2002 | Hara et al. | |
| 2002/0129898 A1 | | 9/2002 | Takuman et al. | |
| 2008/0255304 A1 | * | 10/2008 | Nakashima et al. | 525/100 |
| 2009/0312475 A1 | | 12/2009 | Tasaki et al. | |

FOREIGN PATENT DOCUMENTS

| | | |
|---|---|---|
| EP | 1903087 A1 | 3/2008 |
| JP | 10060281 A | 3/1998 |
| JP | 2002285130 A | 10/2002 |
| JP | 2006117823 A | 5/2006 |
| JP | 2006335872 A | 12/2006 |
| JP | 2010163478 A | 7/2010 |

OTHER PUBLICATIONS

Silicones: An Introduction to Their Chemistry and Applications Chapel River Press Ltd., Andover, Hants, p. 26-27.*
English language abstract for JP 2002285130 extracted from espacenet.com database on Apr. 8, 2014, 21 pages.
English language abstract and machine-assisted translation for JP 2006117823 extracted from PAJ database on Apr. 8, 2014, 30 pages.
English language abstract for JP 2006335872 extracted from espacenet.com database on Apr. 8, 2014, 11 pages.
English language abstract and machine-assisted translation for JP 10060281 extracted from PAJ database on Apr. 8, 2014, 29 pages.
English language abstract and machine-assisted translation for JP 2010163478 extracted from PAJ database on Apr. 8, 2014, 41 pages.
International Search Report for Application No. PCT/JP2012/059274 dated May 14, 2012, 3 pages.

* cited by examiner

*Primary Examiner* — Marc Zimmer
(74) *Attorney, Agent, or Firm* — Howard & Howard Attorneys PLLC

(57) ABSTRACT

A two-part curable liquid silicone rubber composition comprises a first liquid composition and a second liquid composition. The first and second liquid compositions are stored separately and yield, upon mixing, a silicone rubber forming composition. The silicone rubber composition comprises: (A) an alkenyl group-containing organopolysiloxane comprising (A-1) an organopolysiloxane having only a silicon-bonded alkenyl group at each molecular terminal and (A-2) an organopolysiloxane having from 1 to 4 silicon-bonded alkenyl groups in side molecular chains and containing not greater than 2.0 wt. % of alkenyl groups; (B) a calcium carbonate powder; (C) a hydrosilylation reaction catalyst; and (D) an organohydrogenpolysiloxane having silicon-bonded hydrogen atoms.

16 Claims, No Drawings

TWO-PART SILICONE RUBBER COMPOSITION

RELATED APPLICATIONS

This application is the National Stage of International Patent Application No. PCT/JP2012/059274, filed on Mar. 28, 2012, which claims priority to and all the advantages of Japanese Application No. JP 2011-075910, filed on Mar. 30, 2011, the content of which is incorporated herein by reference.

TECHNICAL FIELD

The present invention relates to a two-part curable liquid silicone rubber composition comprising a first composition and a second composition, which are stored separately and upon mixing can form a silicone rubber forming composition.

BACKGROUND ART

Since silicone rubber compositions that contain a calcium carbonate powder and are cured by a hydrosilylation reaction also contain an alkali component as an impurity of said calcium carbonate powder, a problem arises during storage of such compositions because they generate gaseous hydrogen as a result of a reaction with an organopolysiloxane having silicon-bonded hydrogen atoms that is included in the composition as a curing agent. As a solution to this problem, Patent Document 1 proposes a silicone rubber composition that comprises a diorganopolysiloxane having at least two alkenyl groups in one molecule, an organopolysiloxane having at least two silicon-bonded hydrogen atoms in one molecule, a platinum metal-type catalyst, and a calcium carbonate powder surface-treated with a partially hydrolyzed condensate of tetraalkoxysilane. As other solutions to this problem, Patent Documents 2 and 3 propose silicone rubber compositions that comprise a diorganopolysiloxane having at least two alkenyl groups in one molecule, a calcium carbonate powder substantially surface-treated with diorganopolysiloxane, an organopolysiloxane having at least two silicon-bonded hydrogen atoms in one molecule, and a platinum metal-type catalyst.

In these cases, it is typical to divide addition reaction curing silicone rubber compositions into two parts for storage (Patent Documents 3 and 4 (Japanese Unexamined Patent Application Publication No. 2006-117823)) and dividing calcium carbonate-containing addition reaction curing silicone rubber compositions into two parts is also proposed. Furthermore, Patent Document 1 described above proposes division of the composition into a first liquid comprising the alkenyl group-containing diorganopolysiloxane, the platinum metal-type catalyst, and the calcium carbonate surface-treated with a partially hydrolyzed condensate of tetraalkoxysilane and a second liquid comprising the alkenyl group-containing diorganopolysiloxane and an organohydrogenpolysiloxane. Moreover, Patent Document 2 proposes division of the composition into a first liquid comprising the alkenyl group-containing diorganopolysiloxane and the calcium carbonate surface-treated with the diorganopolysiloxane and a second liquid comprising an organohydrogenpolysiloxane, the platinum metal-type catalyst, and an adhesion-imparting agent.

Patent Documents 5 and 6 propose providing a two-part silicone rubber composition in which calcium carbonate is not mixed with a liquid comprising an organohydrogenpolysiloxane having, on average, at least two SiH groups in one molecule whereby, even when storing the two liquids for an extended period of time, changes in viscosity of a composition comprising a curing agent are small, the liquids can be uniformly mixed at a volume ratio of 1:1 using a motionless mixer such as a static mixer or the like, and physical properties of the silicone rubber and adhesion to silicone rubber can be obtained as initially planned.

However, there is no recitation in any of these patents regarding changes in physical properties and/or adhesion in cases where the volume ratio, when forming a silicone rubber forming composition by mixing the separately stored first composition and second composition, varies.

PRIOR ART DOCUMENTS

Patent Documents

Patent Document 1: Japanese Unexamined Patent Application Publication No. H-10-60281
Patent Document 2: Japanese Unexamined Patent Application Publication No. 2002-38016
Patent Document 3: Japanese Unexamined Patent Application Publication No. 2002-285130
Patent Document 4: Japanese Unexamined Patent Application Publication No. 2006-117823
Patent Document 5; Japanese Unexamined Patent Application Publication No. 2006-335872
Patent Document 6: Japanese Unexamined Patent Application Publication No. 2010-163478

SUMMARY OF INVENTION

Technical Problem

An object of the present invention is to provide a two-part curable liquid silicone rubber composition comprising a first composition and a second composition that are stored separately, in which the physical properties and the adhesion to silicone rubber of a cured product thereof do not decline when mixed even in cases where a mixture ratio of the first composition to the second composition varies.

Solution to Problem

A two-part curable liquid silicone rubber composition of the present invention comprises
a first liquid composition essentially including components (A), (B), and (C), but not (D) described below and a second liquid composition essentially including components (A), (B), and (D), but not (C) described below, which are stored separately and yield upon mixing a silicone rubber forming composition comprising:

(A) 100 parts by weight of an alkenyl group-containing organopolysiloxane consisting essentially of (A-1) an organopolysiloxane having only a silicon-bonded alkenyl group at each molecular terminal (at an amount where the vinyl groups in the component (A-1) is from 70 wt. % to 99.8 wt. % of the vinyl groups in the component (A)), and (A-2) an organopolysiloxane having from 1 to 4 silicon-bonded alkenyl groups in side molecular chains and containing not greater than 2.0 wt. % of alkenyl groups (at an amount where the vinyl groups in the component (A-2) is from 0.2 wt. % to 30 wt. % of the vinyl groups in the component (A));

(B) from 1 to 200 parts by weight of a calcium carbonate powder;

(C) a hydrosilylation reaction catalyst (at an amount required for curing the composition); and (D) an organohydrogenpolysiloxane having at least two silicon-bonded hydrogen atoms in one molecule (at an amount where a molar ratio of the silicon-bonded hydrogen atoms in this component to the silicon-bonded alkenyl groups in the component (A) is from 0.015 to 30.0).

The component (B) is preferably a light or precipitated calcium carbonate powder. Furthermore, the first liquid composition and/or the second liquid composition preferably comprises from 0.1 to 100 parts by weight per 100 parts by weight of the component (A) of (E) an amorphous silica powder.

The two-part curable liquid silicone rubber composition described above is useful as a silicone rubber coated fabric use adhesive and as a silicone rubber coated fabric use sealer.

Advantageous Effects of Invention

With the two-part curable liquid silicone rubber composition of the present invention, the physical properties and the adhesion to silicone rubber of a cured product thereof are maintained upon mixing a first composition and a second composition that are stored separately, even in cases where a mixture ratio of the first composition to the second composition varies.

DESCRIPTION OF EMBODIMENTS

A two-part curable liquid silicone rubber composition of the present invention is described in detail below.

A component (A) is a main component of the two-part curable liquid silicone rubber composition of the present invention and is an alkenyl group-containing organopolysiloxane comprising components (A-1) and (A-2) described below.

The component (A-1) is a diorganopolysiloxane having only alkenyl groups at each molecular terminals. The molecular structure of the component (A-1) is substantially straight, but a portion of the molecular chain may be partially branched provided that the object of the present invention is not inhibited. A viscosity at 25° C. of the component (A-1) is not limited, but is preferably in a range from 100 to 1,000,000 mPa·s and more preferably in a range from 100 to 500,000 mPa·s.

Examples of the alkenyl groups in the component (A-1) include vinyl groups, allyl groups, butenyl groups, pentenyl groups, hexenyl groups, and heptenyl groups. Of these, vinyl groups are preferable. Moreover, examples of silicon-bonded organic groups in the component (A-1) other than the alkenyl groups include methyl groups, ethyl groups, propyl groups, butyl groups, pentyl groups, hexyl groups, and similar alkyl groups; phenyl groups, tolyl groups, xylyl groups, and similar aryl groups; and 3-chloropropyl groups, 3,3,3-trifluoropropyl groups, and similar halogenated alkyl groups. Of these, methyl groups and phenyl groups are preferable.

Examples of the diorganopolysiloxane component (A-1) described above include dimethylpolysiloxanes capped at both molecular terminals with dimethylvinylsiloxy groups; diorganopolysiloxanes in which a part or all of the methyl groups thereof are substituted by ethyl groups, propyl groups, or similar alkyl groups, phenyl groups, tolyl groups, or similar aryl groups, 3,3,3-trifluoropropyl groups, or similar halogenated alkyl groups; diorganopolysiloxanes in which a part or all of the vinyl groups thereof are substituted by allyl groups, propenyl groups, or similar alkenyl groups; and mixtures of two or more of the diorganopolysiloxanes described above.

A compounded amount of the component (A-1) is an amount such that the vinyl groups in the component (A-1) are from 70.0 to 99.8 wt. %, preferably from 80.0 to 99.0 wt. %, and more preferably from 90.0 to 98.0 wt. %, of the vinyl groups in the component (A).

The component (A-2), provides the two-part curable liquid silicone rubber composition of the present invention with properties by which there will be little change in the physical properties, and the adhesion to silicone rubber of a cured product of the composition when mixed, even in cases where a mixture ratio of the first composition to the second composition, which are stored separately, varies. The component (A-2) is an organopolysiloxane having, on average, from 1 to 4 silicon-bonded alkenyl groups in the side molecular chains, and containing not greater than 2.0 wt. % of alkenyl groups. Additionally, the component (A-2) may or may not have an alkenyl group at the molecular terminal. The molecular structure of the component (A-2) is substantially straight, but a portion of the molecular chain may be partially branched provided that the object of the present invention is not inhibited. The component (A-2) may be a liquid or a raw rubber-like organopolysiloxane gum having a plasticity stipulated in JIS K6249 at room temperature. A viscosity at 25° C. of the component (A-2) is preferably from 100 to 1,000,000 mPa·s.

Examples of the alkenyl groups in the component (A-2) include vinyl groups, allyl groups, butenyl groups, pentenyl groups, hexenyl groups, and heptenyl groups. Of these, vinyl groups are preferable. Moreover, examples of silicon-bonded organic groups in the component (A-2) other than the alkenyl groups include methyl groups, ethyl groups, propyl groups, butyl groups, pentyl groups, hexyl groups, and similar alkyl groups; phenyl groups, tolyl groups, xylyl groups, and similar aryl groups; and 3-chloropropyl groups, 3,3,3-trifluoropropyl groups, and similar halogenated alkyl groups. Of these, methyl groups and phenyl groups are preferable.

Examples of the diorganopolysiloxane component (A-2) described above include copolymers of dimethylsiloxane and methylvinylsiloxane capped at both molecular terminals with dimethylvinylsiloxy groups; copolymers of dimethylsiloxane and methylvinylsiloxane capped at both molecular terminals with trimethylsiloxy groups; diorganopolysiloxanes in which a part or all of the methyl groups thereof are substituted by ethyl groups, propyl groups, or similar alkyl groups, phenyl groups, tolyl groups, or similar aryl groups, 3,3,3-trifluoropropyl groups, or similar halogenated alkyl groups; diorganopolysiloxanes in which a part or all of the vinyl groups thereof are substituted by allyl groups, propenyl groups, or similar alkenyl groups; and mixtures of two or more of the diorganopolysiloxanes described above.

A compounded amount of the component (A-2) is an amount such that the vinyl groups in the component (A-2) are from 0.2 to 30.0 wt. %, preferably from 1.0 to 80.0 wt. %, and more preferably from 2.0 to 90.0 wt. %, of the vinyl groups in the component (A). This is because when the compounded amount of the component (A-2) is within the range described above, even in cases where a mixture ratio of the two-part curable liquid silicone rubber composition of the present invention varies, variation in the physical properties and the adhesion to silicone rubber of a cured product of the composition is suppressed.

The component (A-2) may be compounded in one or both of the separately stored first composition and second composition.

Component (B) is a calcium carbonate powder that enhances the adhesion of the composition to silicone rubber. A BET specific surface area of the component (B) is not particularly limited, but is preferably from 5 to 50 m²/g and more preferably from 10 to 50 m$^2$/g. Examples of the calcium carbonate powder component (B) include heavy or dry-ground calcium carbonate powder, light or precipitated calcium carbonate powder, and these calcium carbonate powders surface-treated with fatty acids, resin acids, or similar organic acids. Of these, light or precipitated calcium carbonate powders are preferable, in particular those that are surface-treated with fatty acids, resin acids, or similar organic acids.

A compounded amount of the component (B) is within a range of 1 to 200 parts by weight, preferably within a range of 5 to 200 parts by weight, and more preferably within a range of 10 to 100 parts by weight per 100 parts by weight of the component (A). This is because if the compounded amount of the component (B) is below the lower limit of the range described above, adhesion of the composition to silicone rubber will tend to decline and, on the other hand, if above the upper limit of the range described above, it will be difficult to prepare a uniform silicone rubber composition.

Component (C) is a platinum-based catalyst that accelerates the curing of the composition. Examples of the platinum-based catalyst component (C) include fine platinum powders, platinum black, chloroplatinic acid, platinum tetrachloride, alcohol solution of chloroplatinic acid, platinum-olefin complexes, platinum-alkenylsiloxane complexes, platinum-carbonyl complexes, as well as powdered methyl methacrylate resins, polycarbonate resins, polystyrene resins, silicone resins, or similar thermoplastic organic resins in which a platinum catalyst is dispersed.

A compounded amount of the component (C) is not particularly limited provided that it is sufficient to cure the composition, but is preferably an amount such that the platinum metal in the component (D) is within a range of 0.01 to 500 parts by weight and more preferably within a range of 0.1 to 100 parts by weight per 1,000,000 parts by weight of the component (A).

The component (C) is compounded only in the separately stored first liquid composition, and is preferably not simultaneously compounded with component (D) described below and stored.

An organohydrogenpolysiloxane component (D) is a component for curing the composition, and has, on average, at least two silicon-bonded hydrogen atoms in one molecule. The component (D) may have a straight, branched, cyclic, or three-dimensional resinous (net-like) structure. Examples of the silicon-bonded organic group in the component (D) include methyl groups, ethyl groups, propyl groups, butyl groups, pentyl groups, hexyl groups, and similar alkyl groups; phenyl groups, tolyl groups, xylyl groups, and similar aryl groups; benzyl groups, phenethyl groups, and similar aralkyl groups; and 3-chloropropyl groups, 3,3,3-trifluoropropyl groups, and similar halogenated alkyl groups. Of these, methyl groups are preferable. A viscosity at 25° C. of the component (D) is not particularly limited, but is preferably within a range of 1 to 1,000,000 mPa·s.

Examples of the organohydrogenpolysiloxane component (D) include dimethylpolysiloxanes capped at both molecular terminals with dimethylhydrogensiloxy groups, copolymers of dimethylsiloxane and methylphenylsiloxane capped at both molecular terminals with dimethylhydrogensiloxy groups, copolymers of dimethylsiloxane and methyl hydrogen siloxane capped at both molecular terminals with trimethylsiloxy groups, copolymers of dimethylsiloxane/methylphenylsiloxane/methyl hydrogen siloxane capped at both molecular terminals with trimethylsiloxy groups, copolymers of dimethylsiloxane and methyl hydrogen siloxane capped at both molecular terminals with dimethylhydrogensiloxy groups, and mixtures of two or more of these organopolysiloxanes.

Of these, dimethylpolysiloxane capped at both molecular terminals with dimethylhydrogensiloxy groups, mixtures of dimethylpolysiloxane capped at both molecular terminals with dimethylhydrogensiloxy groups and copolymers of dimethylsiloxane and methyl hydrogen siloxane capped at both molecular terminals with trimethylsiloxy groups, or mixtures of dimethylpolysiloxane capped at both molecular terminals with dimethylhydrogensiloxy groups and copolymers of dimethylsiloxane and methyl hydrogen siloxane copolymer capped at both molecular terminals with dimethylhydrogensiloxy groups are preferable. This is because if a dimethylpolysiloxane capped at both molecular terminals with dimethylhydrogensiloxy groups is used, the physical properties and adhesion of the cured product of the composition of the present invention tend to improve.

In cases when a mixture of a dimethylpolysiloxane capped at both molecular terminals with dimethylhydrogensiloxy groups and another organohydrogenpolysiloxane is used as the component (D), the silicon-bonded hydrogen atoms in the dimethylpolysiloxane capped at both molecular terminals with dimethylhydrogensiloxy groups preferably constitute from 80.0 to 99.9 wt. % of the silicon-bonded hydrogen atoms in the component (D).

A compounded amount of the component (D) is an amount such that the molar ratio of the silicon-bonded hydrogen atoms in the component (D) to the alkenyl groups in the component (A) is within a range of 0.015 to 30, preferably within a range of 0.1 to 10, and more preferably within a range of 0.1 to 5. This is because if the molar ratio of the silicon-bonded hydrogen atoms in the component (D) to the alkenyl groups in the component (A) is below the lower limit of the range described above, the obtained composition will tend not to sufficiently cure and, on the other hand, if above the upper limit of the range described above, the mechanical characteristics of the obtained silicone rubber will tend to decline.

The component (D) is compounded only in the separately stored second liquid composition, and is preferably not simultaneously compounded with the component (C) described above and stored.

The first liquid composition and/or the second liquid composition may further comprise (E) a silica powder for enhancing the mechanical strength of the silicone rubber obtained by curing the composition. Examples of the component (E) include fumed silica, precipitated silica, baked silica, crushed quartz, and the aforementioned silica powders surface-treated with organoalkoxysilanes, organohalosilanes, organosilazanes, or similar organosilicon compounds. In order to sufficiently improve the mechanical strength of the obtained adhesive cured product, a silica powder having a BET specific surface area of not less than 50 m$^2$/g is preferably used as the component (E).

A compounded amount of the component (E) can be determined as desired, but in order to improve the mechanical strength of the obtained silicone rubber, is preferably within a range of 1 to 100 parts by weight and more preferably within a range of 1 to 50 parts by weight per 100 parts by weight of the component (A) in the silicone rubber forming composition obtained by mixing the first liquid composition and the second liquid composition.

Additionally, the first liquid composition and/or the second liquid composition may comprise, as an optional component, fumed titanium oxide, diatomaceous earth, aluminum oxide, aluminosilicate, silver, nickel, or a similar inorganic filler; or the aforementioned inorganic fillers surface-treated with the organosilicon compound described above.

Additionally, examples of an adhesion-imparting agent that the first liquid composition and/or the second liquid composition may comprise, which enhances the adhesion properties thereof, include methyl trimethoxysilane, vinyl trimethoxysilane, allyltrimethoxysilane, 3-methacryloxypropyltrimethoxysilane, 3-glycidoxypropyltrimethoxysilane, 3-aminopropyltrimethoxysilane, N-(2-aminoethyl)-3-aminopropyl trimethoxysilane, bis(trimethoxysilyl) propane, bis(trimethoxysilyl) hexane, or a similar silane coupling agent; tetraethyl titanate, tetrapropyl titanate, tetrabutyl titanate, tetra(2-ethylhexyl) titanate, titanium ethyl acetonate, titanium acetyl acetonate, or a similar titanium compound; aluminum ethylacetoacetate diisopropylate, aluminum tris (ethylacetoacetate), alkylacetoacetate aluminum diisopropylate, aluminum tris(acetylacetonate), aluminum monoacetylacetonate bis(ethylacetoacetate), or a similar aluminum compound; and zirconium acetylacetonate, zirconium butoxyacetylacetonate, zirconium bisacetylacetonate, and zirconium ethylacetoacetate, or a similar zirconium compound. A compounded amount of these adhesion-imparting agents is not particularly limited, but is preferably within a range of 0.01 to 10 parts by weight per 100 parts by weight of the component (A) in the silicone rubber forming composition obtained by mixing the first liquid composition and the second liquid composition.

Furthermore, examples of a curing inhibitor that the first liquid composition and/or the second liquid composition preferably comprises in order to enhance the storage stability and handling/workability thereof include 2-methyl-3-butyne-2-ol, 3,5-dimethyl-1-hexyn-3-ol, 2-phenyl-3-butyne-2-ol, ethynylcyclohexanol, or similar acetylene-based compounds; 3-methyl-3-pentene-1-yne, 3,5-dimethyl-3-hexene-1-yne, or similar en-yne compounds; 1,3,5,7-tetramethyl-1, 3,5,7-tetravinylcyclotetrasiloxane, 1,3,5,7-tetramethyl-1,3,5,7-tetrahexenylcyclotetrasiloxane, methylvinylsiloxane capped at both molecular terminals with silanol groups, methylvinylsiloxane-dimethylsiloxane copolymers capped at both molecular terminals with silanol groups, or similar organosiloxane compounds having 5 wt. % or more vinyl groups in one molecule; benzotriazole or similar triazoles, phosphines, mercaptans, hydrazines, or other curing inhibitors.

A compounded amount of these curing inhibitors is not particularly limited, but is preferably within a range of 0.001 to 5 parts by weight per 100 parts by weight of the component (A) in the silicone rubber forming composition obtained by mixing the first liquid composition and the second liquid composition.

The two-part curable liquid silicone rubber composition of the present invention comprises the separately stored first liquid composition essentially including the component (A), the component (B), and the component (C), but not component (D), and the second liquid composition essentially including the component (A), the component (B), and the component (D), but not the component (C). The first liquid composition and the second liquid composition are preferably mixed at a mixture ratio of 1:1 (expressed as a volume ratio) and used as the silicone rubber forming composition. This is because in cases where the mixture ratio is unintentionally changed at any type of flow rate measurement device attached to a dispensing device such as a gear pump, pail pump, drum pump, or the like, changes in the formulation of the silicone rubber forming composition will be relatively small.

A ratio of the component (A-1) to the component (A-2) in the component (A) in the first liquid composition and the second liquid composition may be set as desired. The ratio of the component (A-1) to the component (A-2) in the component (A) in the first liquid composition and the second liquid composition may be equivalent, or either only the first liquid composition or the second liquid composition may comprise the component (A-2).

Moreover, a difference in viscosity between the first liquid composition and the second liquid composition is preferably small. This is because a small difference in viscosity leads to the advantage of maintaining a constant mixture ratio of the first liquid composition and the second liquid composition at any type of flow rate measurement device attached to a dispensing device such as a gear pump, pail pump, drum pump, or the like.

With the two-part curable liquid silicone rubber composition of the present invention, the first liquid composition and the second liquid composition are stored separately. Silicone rubber formation is provided by producing a silicone rubber forming composition by mixing the first liquid composition and the second liquid composition immediately prior to use. Preferably, an apparatus is used that comprises: a first tank in which the first liquid composition is stored and a second tank in which the second liquid composition is stored; a feeding apparatus that supplies a specific amount of each liquid composition to a mixing device via a dispensing device and a flow rate control device connected to each of the tanks; a mixing device such as a pin mixer or similar dynamic mixer or static mixer for mixing the first liquid composition and the second liquid composition; and a device for dispensing the silicone rubber forming composition obtained from the mixing device.

Methods for preparing the first liquid composition and the second liquid composition are not particularly limited, and these liquid compositions can be prepared by mixing components (A) to (E) and, as necessary, additional optional components. In cases when it is necessary to add these other optional components, these other optional components may be added when preparing the base compound or, alternatively, in cases when these other optional components degrade as a result of hot mixing, are preferably added when adding the components (B) to (E). Additionally, when preparing the base compound, the organosilicon compound may be added and the component (E) may be subjected to an in-situ surface treatment. The adhesive composition may be prepared using a two-roll mill, a kneader/mixer, a Ross® mixer, or similar known mixing device.

EXAMPLES

Practical Examples and Comparative Examples of the silicone rubber composition of the present invention are described in detail below. Note that in the Examples, "viscosity" is defined as "viscosity at 25° C." and silicone rubber characteristics are measured as follows.

Plasticity of the Organopolysiloxane Gum

The plasticity of the organopolysiloxane gum that has a raw rubber-like form at room temperature was measured in accordance with JIS K6249 and expressed in mm.

Physical Properties of the Silicone Rubber

The silicone rubber was fabricated by allowing the silicone rubber composition to sit at rest for one day at 25° C. Hardness of this silicone rubber was measured using a type-A durometer stipulated by JIS K6253. Additionally, a sample having a deformed grip portion in the form of a No. 7 dumbbell stipulated by JIS K6251 was fabricated by allowing this silicone rubber composition to sit at rest for one day at 25° C.

Next, the tensile strength and elongation of the sample was measured in accordance with the methods stipulated in JIS K6251.

Adhesion to Silicone Rubber

Adhesion of the silicone rubber composition to silicone rubber was measured as follows in accordance with the method stipulated in JIS K6854. Specifically, the silicone rubber composition was applied in the form of a 50 mm-wide strip onto a nylon base material coated with 30 g/m$^2$ of silicone rubber. Then a silicone rubber-coated nylon tape was overlaid on the nylon tape on which the silicone rubber composition was applied so that the composition formed a 0.7 mm-thick layer between the silicone rubber-coated nylon tapes. The coated base material was allowed to sit at rest for one day at 25° C. to cure the composition, whereby a sample was fabricated. Then, adhesive strength to silicone rubber was measured by subjecting the obtained silicone rubber-coated nylon tape to a T-shaped peeling test at a peeling speed of 200 mm/min.

Practical Example 1

A first liquid composition was prepared by mixing 99.1 parts by weight of a dimethylpolysiloxane capped at both molecular terminals with dimethylvinylsiloxy groups (viscosity=40,000 mPa·s); 2.0 parts by weight of a dimethylsiloxane-methylvinylsiloxane copolymer capped at both molecular terminals with dimethyvinyllsiloxy groups having vinyl groups at both molecular terminals and on the side molecular chains (viscosity=350 mPa·s, vinyl group content=0.93 wt. %, average number of vinyl groups on the molecular side chains=2.5); 3.0 parts by weight of fumed silica surface-treated with dimethyldichlorosilane and having a BET specific surface area of about 110 m$^2$/g; 25 parts by weight of precipitated calcium carbonate powder surface-treated with fatty acids and having a BET specific surface area of 18 m$^2$/g (Hakuenka CCR, manufactured by Shiraishi Kogyo Kaisha, Ltd.); 3.0 parts by weight of dimethylpolysiloxane capped at both molecular terminals with silanol groups (viscosity=40 mPa·s); a 1,3-divinyltetramethyl disiloxane solution of a 1,3-divinyltetramethyl disiloxane platinum complex (included at an amount such that the amount of platinum metal in the catalyst is 50 parts by weight per 1,000,000 parts by weight of the present composition); and 2.0 parts by weight of a pigment paste in which 40 parts by weight of red iron oxide are compounded with 60 parts by weight of a dimethylpolysiloxane capped at both molecular terminals with dimethylvinylsiloxy groups (viscosity=10,000 mPa·s).

Additionally, a second liquid composition was prepared by mixing 98.9 parts by weight of a dimethylpolysiloxane capped at both molecular terminals with dimethylvinylsiloxy groups (viscosity=40,000 mPa·s); 3.0 parts by weight of fumed silica surface-treated with dimethyldichlorosilane and having a BET specific surface area of about 110 m$^2$/g; 25 parts by weight of precipitated calcium carbonate powder surface-treated with fatty acids and having a BET specific surface area of 18 m$^2$/g (Hakuenka CCR, manufactured by Shiraishi Kogyo Kaisha, Ltd.); 3.0 parts by weight of dimethylpolysiloxane capped at both molecular terminals with silanol groups (viscosity=40 mPa·s); and 6.25 parts by weight of a dimethylpolysiloxane capped at both molecular terminals with dimethylhydrogensiloxy groups (kinetic viscosity=10 mm$^2$/s, silicon-bonded hydrogen atom content=about 0.16 wt. %).

Silicone rubber compositions were mixed and prepared such that weight ratios of the first liquid composition to the second liquid composition were 110:100, 100:100, and 100:110. The physical properties and adhesive strength and adhesion ratio of the silicone rubber obtained by curing this silicone rubber composition were measured and the results thereof were recorded in Table 1.

Practical Example 2

A first liquid composition was prepared in the same manner as the first liquid composition of Practical Example 1 with the exceptions that the amount of the dimethylpolysiloxane capped at both molecular terminals with dimethylvinylsiloxy groups (viscosity=40,000 mPa·s) was changed to 99.5 parts by weight, and the amount of the dimethylsiloxane-methylvinylsiloxane copolymer capped at both molecular terminals with dimethyvinyllsiloxy groups having vinyl groups at both molecular terminals and on the side chains (viscosity=350 mPa·s, vinyl group content=0.93 wt. %, average number of vinyl groups on the side molecular chains=2.5) was changed to 1.5 parts by weight.

Additionally, a second liquid composition was prepared in the same manner as the second liquid composition of Practical Example 1 with the exception that 5.85 parts by weight of a dimethylpolysiloxane capped at both molecular terminals with dimethylhydrogensiloxy groups (kinetic viscosity=10 mm$^2$/s, silicon-bonded hydrogen atom content=about 0.16 wt. %) and 0.25 parts by weight of a copolymer of dimethylsiloxane and methyl hydrogen siloxane capped at both molecular terminals with trimethylsiloxy groups (kinetic viscosity=12 mm$^2$/s, silicon-bonded hydrogen atom content=about 0.20 wt. %) were used in place of the 6.25 parts by weight of the dimethylpolysiloxane capped at both molecular terminals with dimethylhydrogensiloxy groups (kinetic viscosity=10 mm$^2$/s, silicon-bonded hydrogen atom content=about 0.16 wt. %).

Silicone rubber compositions were mixed and prepared such that weight ratios of the first liquid composition to the second liquid composition were 110:100, 100:100, and 100:110. The physical properties and adhesive strength and adhesion ratio of the silicone rubber obtained by curing this silicone rubber composition were measured and the results thereof were recorded in Table 1.

Practical Example 3

A first liquid composition was prepared in the same manner as the first liquid composition of Practical Example 1 with the exceptions that the amount of the dimethylpolysiloxane capped at both molecular terminals with dimethylvinylsiloxy groups (viscosity=40,000 mPa·s) was changed to 88.5 parts by weight, and 12.5 parts by weight of a dimethylsiloxane-methylvinylsiloxane copolymer capped at both molecular terminals with trimethylsiloxy groups (viscosity=7,000 mPa·s, vinyl group content=0.15 wt. %, average number of vinyl groups on the side molecular chains=3) was used in place of the dimethylsiloxane-methylvinylsiloxane copolymer capped at both molecular terminals with dimethyvinyllsiloxy groups having vinyl groups at both molecular terminals and on the side chains (viscosity=350 mPa·s, vinyl group content=0.93 wt. %, average number of vinyl groups on the side molecular chains=2.5).

Additionally, a second liquid composition was prepared in the same manner as the second liquid composition of Practical Example 1 with the exception that the amount of the dimethylpolysiloxane capped at both molecular terminals with dimethylhydrogensiloxy groups (kinetic viscosity=10 mm$^2$/s, silicon-bonded hydrogen atom content=about 0.16 wt. %) was changed to 6.05 parts by weight.

Silicone rubber compositions were mixed and prepared such that weight ratios of the first liquid composition to the second liquid composition were 110:100, 100:100, and 100:110. The physical properties and adhesive strength and adhesion ratio of the silicone rubber obtained by curing this silicone rubber composition were measured and the results thereof were recorded in Table 1.

Practical Example 4

A first liquid composition was prepared in the same manner as the first liquid composition of Practical Example 3 with the exceptions that the amount of the dimethylpolysiloxane capped at both molecular terminals with dimethylvinylsiloxy groups (viscosity=40,000 mPa·s) was changed to 91.0 parts by weight, and the amount of the dimethylsiloxane-methylvinylsiloxane copolymer capped at both molecular terminals with trimethylsiloxy groups (viscosity=7,000 mPa·s, vinyl group content=0.15 wt. %, average number of vinyl groups on the side molecular chains=3) was changed to 10.0 parts by weight.

Additionally, a second liquid composition was prepared in the same manner as the second liquid composition of Practical Example 3 with the exception that 5.90 parts by weight of a dimethylpolysiloxane capped at both molecular terminals with dimethylhydrogensiloxy groups (kinetic viscosity=10 mm$^2$/s, silicon-bonded hydrogen atom content=about 0.16 wt. %) and 0.10 parts by weight of a copolymer of dimethylsiloxane and methyl hydrogen siloxane capped at both molecular terminals with trimethylsiloxy groups (kinetic viscosity=12 mm$^2$/s, silicon-bonded hydrogen atom content=about 0.20 wt. %) were used in place of the dimethylpolysiloxane capped at both molecular terminals with dimethylhydrogensiloxy groups (kinetic viscosity=10 mm$^2$/s, silicon-bonded hydrogen atom content=about 0.16 wt. %).

Silicone rubber compositions were mixed and prepared such that weight ratios of the first liquid composition to the second liquid composition were 110:100, 100:100, and 100:110. The physical properties and adhesive strength and adhesion ratio of the silicone rubber obtained by curing this silicone rubber composition were measured and the results thereof were recorded in Table 1.

Practical Example 5

A first liquid composition was prepared by mixing 97 parts by weight of a dimethylpolysiloxane capped at both molecular terminals with dimethylvinylsiloxy groups (viscosity=40,000 mPa·s); 4.0 parts by weight of a dimethylsiloxane-methylvinylsiloxane copolymer gum capped at both molecular terminals with trimethylsiloxy groups having vinyl groups at both molecular terminals and on the side molecular chains (plasticity=1.3 mm, vinyl group content=0.075 wt. %, average number of vinyl groups on the molecular side chains=2.5); 30 parts by weight of precipitated calcium carbonate powder surface-treated with fatty acids and having a BET specific surface area of about 18 m$^2$/g (Hakuenka CCR, manufactured by Shiraishi Kogyo Kaisha, Ltd.); 3.0 parts by weight of dimethylpolysiloxane capped at both molecular terminals with silanol groups (viscosity=40 mPa·s); a 1,3-divinyltetramethyl disiloxane solution of a 1,3-divinyltetramethyl disiloxane platinum complex (included at an amount such that the amount of platinum metal in the catalyst is 50 parts by weight per 1,000,000 parts by weight of the present composition); and 2.0 parts by weight of a pigment paste in which 40 parts by weight of red iron oxide are compounded with 60 parts by weight of a dimethylpolysiloxane capped at both molecular terminals with dimethylvinylsiloxy groups (viscosity=10,000 mPa·s).

Additionally, a second liquid composition was prepared by mixing 95.0 parts by weight of a dimethylpolysiloxane capped at both molecular terminals with dimethylvinylsiloxy groups (viscosity=40,000 mPa·s); 4.0 parts by weight of a dimethylsiloxane-methylvinylsiloxane copolymer gum capped at both molecular terminals with trimethylsiloxy groups having vinyl groups at both molecular terminals and on the side molecular chains (plasticity=1.3 mm, vinyl group content=0.075 wt. %, average number of vinyl groups on the molecular side chains=2.5); 30 parts by weight of precipitated calcium carbonate powder surface-treated with fatty acids and having a BET specific surface area of 18 m$^2$/g (Hakuenka CCR, manufactured by Shiraishi Kogyo Kaisha, Ltd.); 3.0 parts by weight of dimethylpolysiloxane capped at both molecular terminals with silanol groups (viscosity=40 mPa·s); and 6.0 parts by weight of dimethylpolysiloxane capped at both molecular terminals with dimethylhydrogensiloxy groups (kinetic viscosity=10 mm$^2$/s, silicon-bonded hydrogen atom content=about 0.16 wt. %).

Silicone rubber compositions were mixed and prepared such that weight ratios of the first liquid composition to the second liquid composition were 110:100, 100:100, and 100:110. The physical properties and adhesive strength and adhesion ratio of the silicone rubber obtained by curing this silicone rubber composition were measured and the results thereof were recorded in Table 1.

Comparative Example 1

A first liquid composition was prepared in the same manner as the first liquid composition of Practical Example 1 with the exception that 101 parts by weight of dimethylpolysiloxane capped at both molecular terminals with dimethylvinylsiloxy groups (viscosity=40,000 mPa·s) was used in place of the dimethylpolysiloxane capped at both molecular terminals with dimethylvinylsiloxy groups (viscosity=40,000 mPa·s) and the dimethylsiloxane-methylvinylsiloxane copolymer capped at both molecular terminals with dimethyvinyllsiloxy groups having vinyl groups at both molecular terminals and on the side chains (viscosity=350 mPa·s, vinyl group content=0.93 wt. %, average number of vinyl groups on the side molecular chains=2.5).

Additionally, a second liquid composition was prepared in the same manner as the second liquid composition of Practical Example 1 with the exception that 5.50 parts by weight of a dimethylpolysiloxane capped at both molecular terminals with dimethylhydrogensiloxy groups (kinetic viscosity=10 mm$^2$/s, silicon-bonded hydrogen atom content=about 0.16 wt. %) and 0.50 parts by weight of a copolymer of dimethylsiloxane and methyl hydrogen siloxane capped at both molecular terminals with trimethylsiloxy groups (kinetic viscosity=12 mm$^2$/s, silicon-bonded hydrogen atom content=about 0.20 wt. %) were used in place of the 6.25 parts by weight of the dimethylpolysiloxane capped at both molecular terminals with dimethylhydrogensiloxy groups (kinetic viscosity=10 mm$^2$/s, silicon-bonded hydrogen atom content=about 0.16 wt. %).

Silicone rubber compositions were mixed and prepared such that weight ratios of the first liquid composition to the second liquid composition were 110:100, 100:100, and 100:110. The physical properties and adhesive strength and adhesion ratio of the silicone rubber obtained by curing this silicone rubber composition were measured and the results thereof were recorded in Table 1.

Comparative Example 2

A first liquid composition was prepared in the same manner as the first liquid composition of Practical Example 1 with the exception that 96.1 parts by weight of dimethylpolysiloxane capped at both molecular terminals with dimethylvinylsiloxy groups (viscosity=40,000 mPa·s) and 5.0 parts by weight of dimethylsiloxane-methylvinylsiloxane copolymer capped at both molecular terminals with trimethylsiloxy groups (viscosity=8,000 mPa·s, vinyl group content=0.30 wt. %, average number of vinyl groups on the side molecular chains=4.6) was used in place of the dimethylpolysiloxane capped at both molecular terminals with dimethylvinylsiloxy groups (viscosity=40,000 mPa·s) and the dimethylsiloxane-methylvinylsiloxane copolymer capped at both molecular terminals with dimethyvinyllsiloxy groups having vinyl groups at both molecular terminals and on the side chains (viscosity=350 mPa·s, vinyl group content=0.93 wt. %, average number of vinyl groups on the side molecular chains=2.5).

Additionally, a second liquid composition was prepared in the same manner as the second liquid composition of Practical Example 1 with the exception that the amount of the dimethylpolysiloxane capped at both molecular terminals with dimethylhydrogensiloxy groups (kinetic viscosity=10 mm²/s, silicon-bonded hydrogen atom content=about 0.16 wt. %) was changed to 6.10 parts by weight.

Silicone rubber compositions were mixed and prepared such that weight ratios of the first liquid composition to the second liquid composition were 110:100, 100:100, and 100:110. The physical properties and adhesive strength and adhesion ratio of the silicone rubber obtained by curing this silicone rubber composition were measured and the results thereof were recorded in Table 1.

suitable for example, as an adhesive for a pouch-like airbag formed by layering silicone rubber-covered surfaces and bonding or stitching edges thereof together.

The invention claimed is:

1. A two-part curable liquid silicone rubber composition comprising a first liquid composition including components (A), (B), and (C), but not (D) described below and a second liquid composition including components (A), (B), and (D), but not (C) described below, which are stored separately and yield, upon mixing, a silicone rubber forming composition comprising:
   (A) 100 parts by weight of an alkenyl group-containing organopolysiloxane comprising (A-1) an organopolysiloxane having only silicon-bonded alkenyl groups at each molecular terminal at an amount where the alkenyl groups in component (A-1) is from 70 wt. % to 99.8 wt. % of the alkenyl groups in component (A), and (A-2) an organopolysiloxane having on average from 1 to 4 silicon-bonded alkenyl groups in side molecular chains and containing not greater than 2.0 wt. % of alkenyl groups at an amount where the alkenyl groups in component (A-2) is from 0.2 wt. % to 30 wt. % of the alkenyl groups in component (A);
   (B) from 1 to 200 parts by weight of a calcium carbonate powder;
   (C) a hydrosilylation reaction catalyst at an amount required for curing the composition; and
   (D) an organohydrogenpolysiloxane having at least two silicon-bonded hydrogen atoms in one molecule at an amount where a molar ratio of the silicon-bonded hydrogen atoms in this component to the silicon-bonded alkenyl groups in component (A) is from 0.015 to 30.0.

2. The two-part curable liquid silicone rubber composition according to claim 1, wherein a mixture ratio expressed as a

TABLE 1

| Sample | First liquid composition/Second liquid composition | Hardness Asker C | Tensile strength (MPa) | Elongation (%) | Adhesion evaluation (thickness = 0.70 mm) | |
|---|---|---|---|---|---|---|
| | | | | | Adhesive strength (N/cm) | Cohesion failure rate (%) |
| Practical Example 1 | 110/100 | 34 | 0.14 | 4400 | 19.8 | 100 |
| | 100/100 | 34 | 0.26 | 3550 | 29.2 | 100 |
| | 100/110 | 32 | 0.36 | 3425 | 32.0 | 100 |
| Practical Example 2 | 110/100 | 32 | 0.30 | 3400 | 41.6 | 100 |
| | 100/100 | 33 | 0.62 | 2775 | 48.2 | 100 |
| | 100/110 | 29 | 0.57 | 2850 | 42.6 | 100 |
| Practical Example 3 | 110/100 | 30 | 0.19 | 3900 | 38.6 | 100 |
| | 100/100 | 29 | 0.27 | 3225 | 35.4 | 100 |
| | 100/110 | 27 | 0.26 | 2800 | 26.0 | 100 |
| Practical Example 4 | 110/100 | 29 | 0.18 | 3625 | 40.2 | 100 |
| | 100/100 | 30 | 0.28 | 3050 | 33.4 | 100 |
| | 100/110 | 26 | 0.28 | 2800 | 27.0 | 100 |
| Practical Example 5 | 110/100 | 28 | 0.10 | 4200 | 15.6 | 100 |
| | 100/100 | 28 | 0.18 | 4000 | 19.8 | 100 |
| | 100/110 | 28 | 0.16 | 3400 | 19.9 | 100 |
| Comparative Example 1 | 110/100 | 23 | 0.13 | 3275 | 17.0 | 0 |
| | 100/100 | 29 | 0.51 | 2925 | 56.0 | 100 |
| | 100/110 | 29 | 0.59 | 2637 | 68.0 | 100 |
| Comparative Example 2 | 110/100 | 26 | 0.10 | 3350 | 15.4 | 100 |
| | 100/100 | 32 | 0.47 | 2775 | 37.6 | 100 |
| | 100/110 | 35 | 0.60 | 2400 | 52.1 | 100 |

INDUSTRIAL APPLICABILITY

The silicone rubber composition of the present invention has excellent adhesion to silicone rubber and, therefore, is volume ratio of the separately stored first liquid composition and second liquid composition is 1:1.

3. The two-part curable liquid silicone rubber composition according to claim 1, wherein component (B) is a light or precipitated calcium carbonate powder.

4. The two-part curable liquid silicone rubber composition according to claim 1, wherein the first liquid composition and/or the second liquid composition further comprises (E) an amorphous silica powder present in an amount of from 0.1 to 100 parts by weight per 100 parts by weight of component (A).

5. The two-part curable liquid silicone rubber composition according to claim 1 that is a silicone rubber coated fabric use adhesive.

6. The two-part curable liquid silicone rubber composition according to claim 1 that is a silicone rubber coated fabric use sealer.

7. The two-part curable liquid silicone rubber composition according to claim 2, wherein component (B) is a light or precipitated calcium carbonate powder.

8. The two-part curable liquid silicone rubber composition according to claim 2, wherein the first liquid composition and/or the second liquid composition further comprises (E) an amorphous silica powder present in an amount of from 0.1 to 100 parts by weight per 100 parts by weight of component (A).

9. The two-part curable liquid silicone rubber composition according to claim 1, wherein component (A-1) is present in an amount where the vinyl groups in component (A-1) is from 80 wt. % to 99 wt. % of the vinyl groups in component (A).

10. The two-part curable liquid silicone rubber composition according to claim 1, wherein component (B) is present in an amount of from 5 to 200 parts by weight per 100 parts by weight of component (A).

11. The two-part curable liquid silicone rubber composition according to claim 1, wherein component (C) is present in an amount of from 0.01 to 500 parts by weight per 1,000,000 parts by weight of component (A).

12. The two-part curable liquid silicone rubber composition according to claim 1, wherein component (D) is present in an amount where a molar ratio of the silicon-bonded hydrogen atoms in component (D) to the silicon-bonded alkenyl groups in component (A) is from 0.1 to 10.

13. The two-part curable liquid silicone rubber composition according to claim 4, wherein the first liquid composition and/or the second liquid composition comprises component (E) in an amount of from 1 to 50 parts by weight per 100 parts by weight of component (A).

14. The two-part curable liquid silicone rubber composition according to claim 1, wherein the alkenyl groups in component (A-1) are vinyl groups.

15. The two-part curable liquid silicone rubber composition according to claim 1, wherein the alkenyl groups in component (A-2) are vinyl groups.

16. The two-part curable liquid silicone rubber composition according to claim 14, wherein the alkenyl groups in component (A-2) are vinyl groups.

* * * * *